Nov. 30, 1965 J. C. SIMS, JR 3,221,314

MULTIPLE CHANNEL MAGNETIC TRANSDUCER

Original Filed Jan. 27, 1953 3 Sheets-Sheet 1

INVENTOR.
JOHN C. SIMS JR.

BY Fred Fisher
ATTORNEY

*INVENTOR.*
JOHN C. SIMS JR.

BY [signature]

ATTORNEY

Nov. 30, 1965 J. C. SIMS, JR 3,221,314

MULTIPLE CHANNEL MAGNETIC TRANSDUCER

Original Filed Jan. 27, 1953 3 Sheets-Sheet 3

INVENTOR.
JOHN C. SIMS JR.

BY [signature]

ATTORNEY

United States Patent Office 3,221,314

Patented Nov. 30, 1965

3,221,314
MULTIPLE CHANNEL MAGNETIC TRANSDUCER

John C. Sims, Jr., Sudbury, Mass., assignor to Sperry Rand Corporation, New York, N.Y., a corporation of Delaware

Original application Jan. 27, 1953, Ser. No. 333,574, now Patent No. 3,012,232, dated Dec. 5, 1961. Divided and this application Dec. 5, 1961, Ser. No. 157,210

5 Claims. (Cl. 340—174.1)

This application is a division of application Serial Number 333,574, filed January 27, 1953, entitled, "High Speed Printer," by John Presper Eckert, Jr., and John C. Sims, Jr., now Patent No. 3,012,232 issued Dec. 5, 1961.

Patent No. 3,012,232 is a continuation in part of a then pending application, Serial No. 221,362, filed April 17, 1951, now abandoned, which application was a substitute for the abandoned original application, Serial No. 143,737, filed on February 11, 1950.

This present invention relates to an electromagnetic apparatus adapted to produce original typographical images.

In many cases it is desired to create typographical images which are not to be reproduced from preexisting typographical originals, but which are to be translated from coded electric signals transmitted to a printer either from some remote point or from computing and business machines as the result of their manipulations and computations.

Accordingly, it is a primary object of this invention to provide an electromagnetic printing apparatus capable of translating coded electric signals into typographical images.

A further object of the invention is to provide an improved type of magnetic head structure which permits heads to be mounted closely enough to record the magnetic images of whole characters in one single scan.

Further objects of the invention will become apparent from the following specification in conjunction with the accompanying figures in which.

Figure 1:
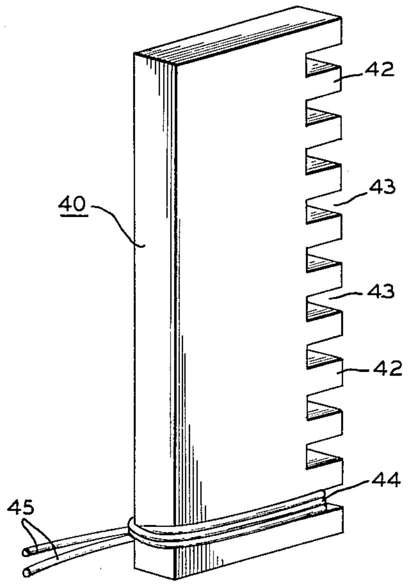
FIGURE 1 is a perspective view of a multiple gap electromagnetic recording head.

FIGURE 1 shows a multiple gap electromagnetic head 40 which may be used in conjunction with a magnetic surface to develop letter shaped magnetic images. The head consists of a comb-like member 42 of high magnetic permeability, which might be made, for example, of soft iron, or the well known alloys such as those sold under the trademark "Hypersil" or "Permalloy." The member 42 may be provided with a plurality of notches leaving gaps 43. For purpose of illustration, ten gaps 43 are shown. The portions of the member 42 corresponding to the respective gaps 43 are wound with separate energizing coils 44. The leads 45 from the ends of said separate energizing coils 44 are connected in proper combinations to a suitable letter forming signal source. In response to the various excitation patterns derived from this letter forming signal source, any combination of energizing coils 44 may be activated. The number of turns per coil 44 and the electric current required is dependent upon the material used in the printing cylinder 59 and the flux density required for proper magnetization on the surface of the cylinder 59 (FIGURE 3).

Figure 2:
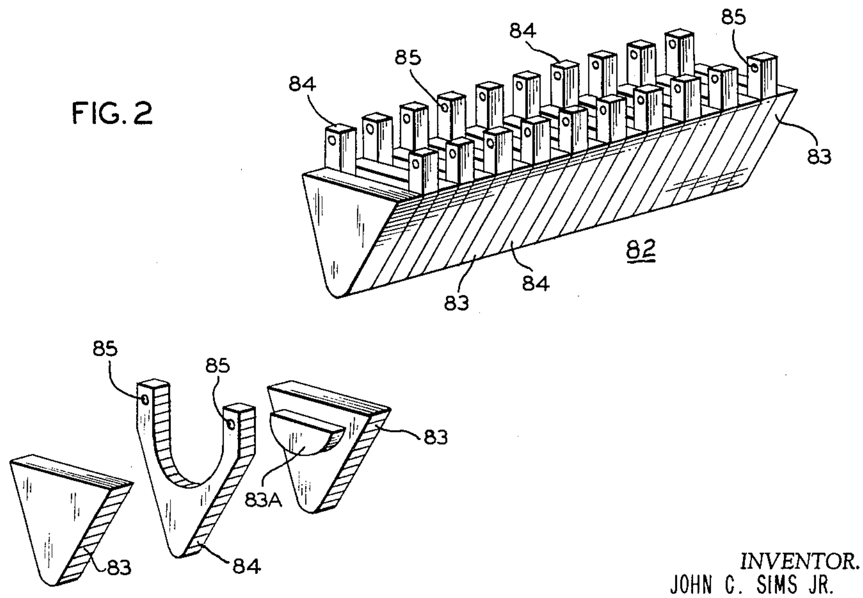
FIGURE 2 is a perspective and, in part, exploded view illustrating another type of a multiple gap electromagnetic recording head.

FIGURE 2, in part in exploded view, represents a laminated type electromagnetic recording head 82 which may be used in place of the comb-type electromagnetic recording head 40 shown in FIGURE 1. This ganged magnetic transducer comprises alternating laminations of relatively diamagnetic conductors and relatively paramagnetic dielectrics. Accordingly, the head is built of copper conductors 84 interspaced and laminated between soft iron spacers 83 of a material similar to the comb 42. Each copper conductor 84 contains at its two outer extremities holes 85 to which leads can be attached and connected to a letter forming signal source. All but one of the soft iron spacers 83 show a protrusion 83A. After the spacers 83 and conductors 84 are laminated together, the spacers 83 are in contact with one another through these protrusions and provide the means for a complete magnetic path. No such protrusion 83A is required on the first spacer 83.

The laminated type ganged head 82 can be used as a substitute for the comb-type head 40, the individual copper conductor 84 on head 82 performing the function of the individual coil 44 on head 40.

Figure 3:
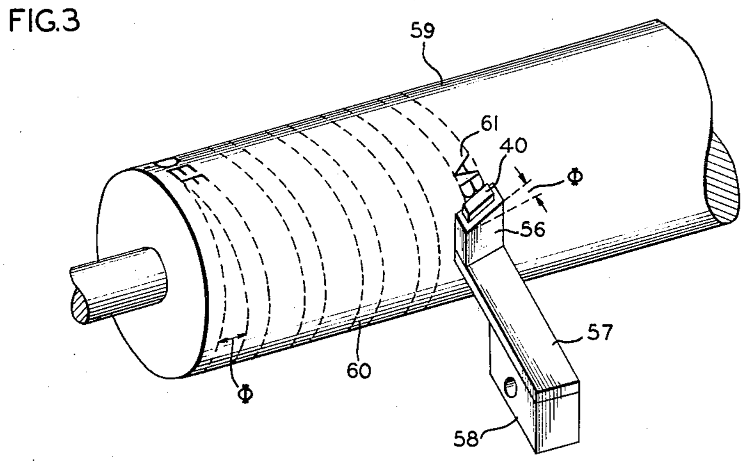
FIGURE 3 is a perspective view of a recording apparatus utilizing the device either shown in FIGURE 1 or in FIGURE 2.

The head 40 is mounted on a head adapter 56 which in turn is attached to an arm 57 fixed to a block 58, as shown in FIGURE 3. It reposes on, or slightly above, a magnetic cylinder 59, and by the method previously described in application Serial Number 221,362 (filed April 17, 1951, by John C. Sims, Jr., entitled, "Method of And Apparatus for Magnetic Printing") is translated parallel to the axis of the cylinder 59. As a result of the rotation of the cylinder and the linear motion of the head, information elements are recorded in a helical path 60. The width of the helical recording 60 is determined by the width of the ganged head 40 from its topmost gap $43_1$ to its bottom most gap $43N_1$. This same width determines the height of the characters 61.

It should be noted that helical recording lines are produced because of the linear motion of the head in relation to the rotation of the cylinder. The head, instead of being given a smooth linear motion, could have an intermittent linear motion. That is, the head would move linearly one unit after each revolution of the cylinder, where a unit would correspond to the height of the characters recorded plus the spacing desired between recorded lines. As a result, the lines of recording on the cylinder would no longer be at the helix angle, but would run parallel or perpendicular, as the case may be, to the axis of the cylinder.

If the recording is made at the helix angle, the need arises to place the lines which form the shape of the individual characters at the same angle, so that these character lines appear parallel or perpendicular to the recording line. To this end, the magnetic head is placed at an angle with the drum axis equal to the helix angle $\Phi$, as indicated in FIGURE 3. Such a position of the head ensures a proper position of the character lines in relation to the helical recording line. It is self-evident, however, that there are numerous other arrangements to accomplish the same purpose.

Figure 4:
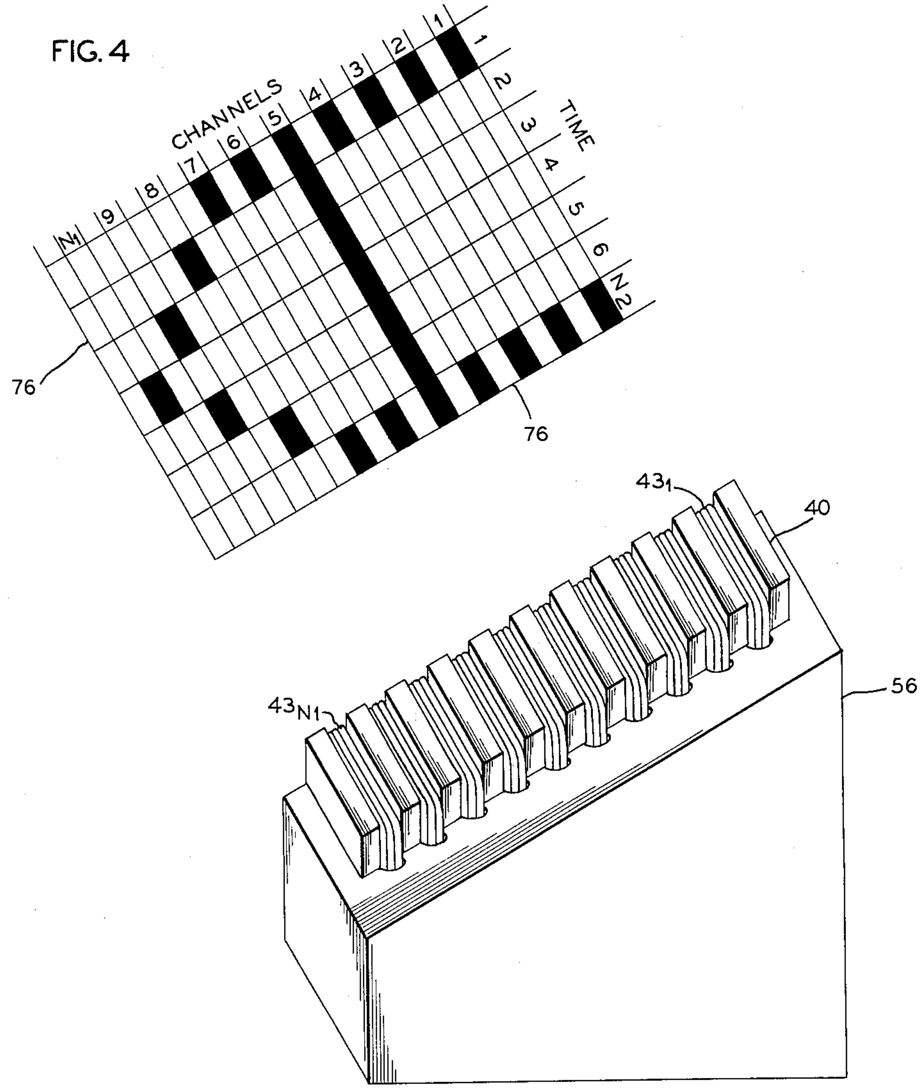
FIGURE 4 is a fragmentary perspective view illustrating the mode of operation of the recording apparatus shown in FIGURE 3.

Referring now both to FIGURES 3 and 4, the exact character desired is recorded upon the cylinder by having the correct gap 43 activated at the correct time in relation to the motion of the head and the rotation of the cylinder. More precisely, to record a given character "A," as shown in FIGURE 3 under 61, there can be considered to be superimposed upon this "A" a matrix or grid 76, where one axis of the grid is time and the other is the number of channels (FIGURE 4). The character to be recorded determines which channels shall be activated in a given time zone. Thus, it can be seen in the case of the letter "A" that in time zone number "one" gaps number "one," "two," "three," "four," "five," "six" and "seven" would be activated. As the cylinder rotates, time zone number "two" occurs, and gaps number "five" and number "eight" are activated. In time zone number "three" the cylinder has again rotated slightly, and gaps number "five" and number "nine" are activated. For the crossbar of letter "A" gap number "five" would remain activated from time zone number "one" to time zone number "$N_2$."

The number of gaps 43 within a given width or distance determine the proximity of the graphic spots which compose the character outlines in the final print. It is, therefore, a compromise between the degree of definition desired in the resulting print and the cost of forming and operating the gaps 43 that leads to the decision of how many gaps are to be provided. An inspection of FIGURE 4 makes it evident that the height of the recorded character is in accordance with the width across the head from its left-most gap 43$N_1$ to the gap 43$_1$ at its extreme right.

Special attention should be given to the direction of the flux lines which are produced by each of the magnetic transducers of the head. The projections of these flux lines upon the magnetic cylinder (FIGURE 3) are parallel to the channel axis of the superimposed grid 76 and perpendicular to its time axis (FIGURE 4). This ensures a proper placing of the magnetic ink which, as has been explained in the earlier application 221,362, can be expected to adhere only to the poles of the magnets. If the position of the transducers and their flux lines were rotated by 90 degrees, a similar adhesion effect could be obtained only through application of modulated carrier waves. The positioning of the transducers and their flux lines eliminates, therefore, the need for the use of such modulated carrier waves and, thus, simplifies the circuitry involved.

Figure 5:
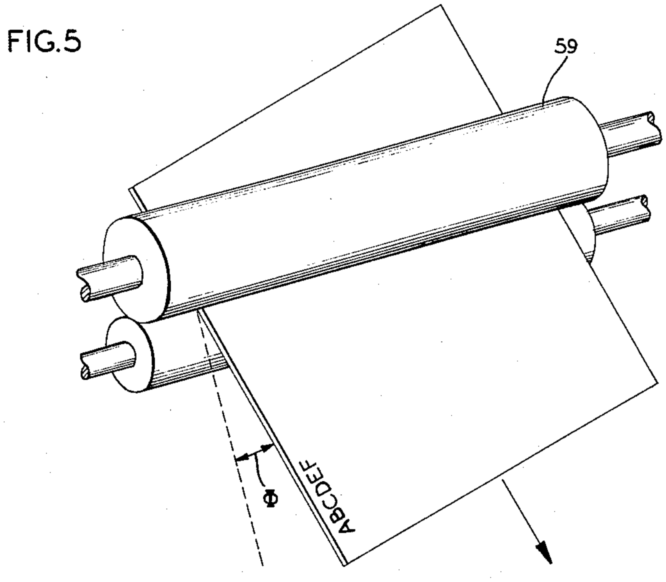
FIGURE 5 is a perspective view illustrating a method of obtaining prints from the image receiving member of the recording apparatus shown in FIGURE 3.

In order to produce a final print in which the writing is in horizontal lines, the paper is fed tangentially to the cylinder 59 at an angle $\Phi$ equal to the helix angle $\Phi$, as shown in FIGURE 5. Thus, straight lines of print are produced on the paper, as set forth in the parent application.

Means for rotating the cylinder, for moving the magnetic head along the cylinder and for feeding the printing paper as well as means for the synchronization of such motions are known. Any of the known devices may be used for the aforementioned purposes without specific explanation.

While specific embodiments have been described in detail to illustrate the principles of the invention, modifications and variations for applying such principles will be apparent to those skilled in the art.

What is claimed is:

1. A multiple channel magnetic transducer comprising alternating laminations of relatively diamagnetic conductors and relatively paramagnetic dielectrics in which said relatively paramagnetic dielectrics are in contact with each other through protrusions.

2. A magnetic transducer according to claim 1 in which each of said relatively diamagnetic conductors is connected to a different electric circuit.

3. In combination, a multiple channel magnetic transducer having a plurality of independent electric coils spaced apart from each other and positioned upon a single magnetic structure, a magnetic surface magnetizable by and movable relative to said multiple channel magnetic transducer, said multiple channel magnetic transducer being positioned such that the flux lines created therefrom as projected upon said magnetic surface are substantially perpendicular to the relative motion between said multiple channel magnetic transducer and said magnetic surface.

4. The combination according to claim 3 in which the alignment of said multiple channel magnetic transducer is such that the flux lines produced therefrom as projected upon said magnetic surface are substantially parallel to said alignment.

5. In combination, a multiple channel magnetic transducer having a plurality of independent electric coils spaced apart from each other and positioned upon a single magnetic structure, a magnetic surface magnetizable by multiple channel magnetic transducer, said multiple channel magnetic transducer being positioned such that the flux lines produced therefrom as projected upon said magnetic surface are substantially perpendicular to the direction of successive recordings.

References Cited by the Examiner

UNITED STATES PATENTS

| | | | |
|---|---|---|---|
| 2,272,821 | 2/1942 | Roys | 179—100.2 |
| 2,411,849 | 12/1946 | Camras | 179—100.2 |
| 2,435,871 | 2/1948 | Camras | 179—100.2 |
| 2,531,642 | 11/1950 | Potter | 179—100.2 |
| 2,532,100 | 11/1950 | Howell | 179—100.2 |
| 2,540,711 | 2/1951 | Camras | 179—100.2 |
| 2,803,708 | 8/1957 | Camras | 179—100.2 |
| 2,804,506 | 8/1957 | Schurch et al. | 340—174.1 |
| 2,813,924 | 11/1957 | Coutant et al. | 179—100.2 |

IRVING L. SRAGOW, *Primary Examiner*.

BERNARD KONICK, *Examiner*.